United States Patent [19]
McKee et al.

[11] Patent Number: 6,008,483
[45] Date of Patent: Dec. 28, 1999

[54] APPARATUS FOR SUPPLYING MICROWAVE ENERGY TO A CAVITY

[75] Inventors: Philip R. McKee, Frisco; Earl R. Winkelmann, Garland; John David Gidner, Dallas, all of Tex.

[73] Assignee: TurboChef Technologies, Inc., Dallas, Tex.

[21] Appl. No.: 09/169,523

[22] Filed: Oct. 9, 1998

[51] Int. Cl.⁶ ................................................ H05B 6/72
[52] U.S. Cl. ........................ 219/746; 219/748; 219/751; 219/697
[58] Field of Search ..................... 219/746, 748, 219/750, 751, 756, 695, 696, 697

[56] References Cited

U.S. PATENT DOCUMENTS

| | | |
|---|---|---|
| 2,593,067 | 4/1952 | Spencer . |
| 2,605,383 | 7/1952 | Spencer . |
| 2,704,802 | 5/1955 | Blass et al. . |
| 2,827,537 | 3/1958 | Haagensen ............................ 219/746 |
| 3,104,303 | 9/1963 | Crapuchettes . |
| 3,104,305 | 9/1963 | Crapuchettes . |
| 3,527,915 | 9/1970 | Haagensen et al. . |
| 3,532,847 | 10/1970 | Puschner ............................ 219/746 |
| 3,557,334 | 1/1971 | Lewis . |
| 3,619,536 | 11/1971 | Boehm . |
| 3,673,370 | 6/1972 | Johnson . |
| 3,676,809 | 7/1972 | Paine et al. . |
| 3,715,551 | 2/1973 | Peterson . |
| 3,806,689 | 4/1974 | Kegereis et al. ...................... 219/746 |
| 3,810,248 | 5/1974 | Risman et al. . |
| 3,851,133 | 11/1974 | Dygve et al. . |
| 4,019,009 | 4/1977 | Kusunoki et al. . |
| 4,316,069 | 2/1982 | Fitzmayer ............................ 219/749 |
| 4,336,434 | 6/1982 | Miller . |
| 4,354,083 | 10/1982 | Staats . |
| 4,839,494 | 6/1989 | Vulpe ................................. 219/746 |
| 5,182,426 | 1/1993 | Sklenak et al. ...................... 219/748 |
| 5,254,823 | 10/1993 | McKee et al. . |
| 5,329,086 | 7/1994 | DeMatteis et al. . |
| 5,434,390 | 7/1995 | McKee et al. . |
| 5,449,888 | 9/1995 | Smith et al. . |
| 5,451,751 | 9/1995 | Takimoto et al. . |
| 5,558,793 | 9/1996 | McKee et al. . |
| 5,567,339 | 10/1996 | Joo et al. . |
| 5,742,033 | 4/1998 | Park . |

FOREIGN PATENT DOCUMENTS 1407852  9/1974  United Kingdom .

*Primary Examiner*—Philip H. Leung
*Attorney, Agent, or Firm*—Amster, Rothstein & Ebenstein

[57] ABSTRACT

A microwave oven excitation system comprising a cylindrical microwave launcher for radiating microwave energy into a heating cavity of a microwave oven which is mounted adjacent to the heating cavity, a quarter-wave matching waveguide secured to the launcher, a rectangular waveguide secured to the quarter-wave matching waveguide, and a source of microwave energy at a predetermined operating frequency secured to the rectangular waveguide remotely from the launcher. In addition, a mode stirrer may be optionally installed within the cylindrical microwave launcher. Also, an iris may be optionally mounted between the cylindrical microwave launcher and the heating cavity.

6 Claims, 5 Drawing Sheets

APPARATUS FOR SUPPLYING MICROWAVE ENERGY TO A CAVITY

FIELD OF THE INVENTION

The invention relates generally to microwave oven cavity excitation systems, and more particularly to an improved microwave oven cavity excitation system which provides a substantially uniform microwave illumination of the cooking surface and in which cavity loading effects are greatly reduced.

BACKGROUND OF THE INVENTION

It is well known that electromagnetic energy can be utilized for heating foodstuff or other lossy dielectric materials. The foodstuff or other materials are placed in a cooking cavity of a microwave oven and are exposed to electromagnetic energy that is supplied by a suitable source, e.g., a magnetron. After a relatively short period of time during which the foodstuff is subjected to electromagnetic energy, heat will be generated in the foodstuff to accomplish the desired cooking of the foodstuff.

In a microwave oven, an ideal system for exciting the cooking cavity with microwave energy would evenly distribute the microwave energy across those portions of the cavity in which the food is located. Since food is normally located in only a limited area of the oven it is desirable to maximize the energy in the portion of the cavity in which the food is to be located.

Microwave ovens have employed numerous types of feed and distribution systems in an attempt to maximize the energy supplied to the food. For example, in British Patent No. 1,407,852, there is disclosed a microwave oven which utilizes "near field" effects of electromagnetic radiation to heat foods. In this method, the food is maintained in close proximity with a radiation element, a proximity preferably less than one wavelength of the exciting electromagnetic energy. Also, in U.S. Pat. No. 3,810,248, a microwave apparatus is described in which food is placed in a container over slotted openings in a waveguide. The food is heated directly by the microwave energy exiting the waveguide, and indirectly by a radiation absorbing layer in the container that is in contact with the food. In addition, U.S. Pat. No. 3,851,133 discloses a microwave oven which includes an antenna chamber, with an antenna in the form of radially extending arms rotating around a common axis mounted therein, disposed adjacent to the cooking cavity with microwave energy being introduced into the cavity through radiation slots disposed on the side of the cavity adjacent the antenna chamber. Also, U.S. Pat. No. 4,019,009 discloses a microwave oven which heats food by subjecting it to a microwave field generated by a surface wave transmission line comprising a slotted wall. See also U.S. Pat. Nos. 2,704,802 and 5,742,033 for other examples of microwave ovens where the microwave energy passes through an aperture before entering the cooking chamber in an effort to provide more uniform heating of the foodstuffs therein.

Other systems similarly have a need for controlling the amount of microwave energy supplied to a heating cavity. For example, U.S. Pat. No. 3,557,334 discloses a system for controlling the heating of a dielectric material in which reflected energy from the heating cavity is directed to a water load instead of back to the microwave power source. Irises are used between the respective waveguide and the heating cavity or water load for impedance transforming purposes. Also, U.S. Pat. No. 3,673,370 discloses a system for heating a filament or thread in a resonant cavity by use of microwave energy in which an iris is used between the heating cavity and the waveguide feeding microwave energy thereto to couple the microwave energy used to excite the heating cavity.

Other known methods for providing a more uniform distribution of microwave energy rely on the use of rotating devices within the cooking cavity, such as a mode stirrer having blades and being driven by a motor cyclically, a rotating food tray, or a rotating antenna. Each of the methods described above has certain drawbacks, particularly if installed in a hybrid oven which combines microwave heating with conventional oven techniques, where the internal temperature of the oven cavity is normally approximately 500 degrees F., such as is more particularly described in U.S. Pat. Nos. 5,254,823, 5,434,390 and 5,558,793.

A particular problem facing many microwave ovens relates to loading effects caused by the size of the foodstuff installed in the cooking cavity. When a small item is placed in the cavity, or especially when the cavity is empty, and the oven is operated, the microwave energy can reflect back to the magnetron, where it is dissipated as heat and can eventually damage the magnetron. A number of methods have been used to prevent such damage to the magnetron. One such method involved placing a thermostat in proximity to the anode of the magnetron to detect the temperature at the magnetron. A control circuit cuts off power to the magnetron when the temperature reached a point at which damage would occur. However, in this method the magnetron can still be stressed by relatively high temperatures. Another method, disclosed in U.S. Pat. No. 3,527,915, provides a no-load sensing device that is mounted within the cooking cavity to cut off the magnetron when a specified temperature is reached within the device. In addition, U.S. Pat. No. 5,451,751 discloses a microwave oven which utilizes a wave guide switching device to vary the energy supplied to the cooking cavity depending upon the load installed therein. Likewise, the system described in U.S. Pat. No. 3,557,334 mentioned above redirects reflected energy to a water load, instead of back to the magnetron. Each of these methods has certain drawbacks, particularly if installed in the hybrid oven described above.

In the aforementioned U.S. Pat. Nos. 5,254,823, 5,434,390 and 5,558,793 to McKee et al. ("the McKee Patents"), the contents of which are explicitly incorporated by reference herein, a hybrid oven is disclosed for cooking by both hot air impingement and microwave energy. Each oven includes an apparatus, which is shown in FIG. 1 hereof and is generally designated by reference numeral 10, for illuminating a heating cavity with microwave energy. In FIG. 1, first magnetron 11 feeds microwave energy at a preselected frequency into first waveguide 12, and second magnetron 13 feeds microwave energy at the same preselected frequency into second waveguide 14. First waveguide 12 and second waveguide 14 each feed the respective microwave energy into the common third waveguide 15, which mixes the microwave energy and directs it into launcher 16. Launcher 16 is a cylindrical waveguide which directs the mixed microwave energy upward into a heating cavity (not shown) disposed directly above launcher 16. In practice, the conventional devices have certain drawbacks. In particular, the loading effects produced were found to be less than optimal and the enclosure somewhat unwieldy in size.

OBJECTS OF THE INVENTION

Accordingly, an object of the present invention is to provide an apparatus for transmitting a substantially uniform pattern of microwave energy to a heating cavity.

An additional object is to provide an apparatus for illuminating a cavity with microwave energy which has a reduced dependence on loading within the cavity.

Yet another object is to provide an apparatus for illuminating a cavity with microwave energy which extends the operating life of the microwave energy source.

A further object is to provide an apparatus for isolating a non-resonant heating cavity from a resonant microwave waveguide.

A still further object is to provide an apparatus for transmitting a substantially uniform pattern of microwave energy to a heating cavity in a smaller package size.

SUMMARY OF THE INVENTION

It has now been found that these and other objects are realized by an apparatus comprising a cylindrical microwave launcher for radiating microwave energy into a heating cavity of an oven, where the cylindrical launcher is mounted directly adjacent to the heating cavity. A two-part waveguide is secured to the cylindrical launcher. The two-part waveguide consists of a quarter-wave matching waveguide section and a rectangular waveguide section. The quarter-wave matching waveguide section has a broad end which is secured to the cylindrical launcher and a narrow end which is connected to the rectangular waveguide section. A source of microwave energy at a predetermined operating frequency is secured to the rectangular waveguide section remotely from the cylindrical launcher.

In another embodiment, a mode stirrer can be installed within the cylindrical microwave launcher to more uniformly distribute the microwave energy supplied to the heating cavity.

In yet another embodiment, an iris may be installed between the heating cavity and the cylindrical microwave launcher to provide greater isolation of the resonant cylindrical microwave launcher and the non-resonant heating cavity.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
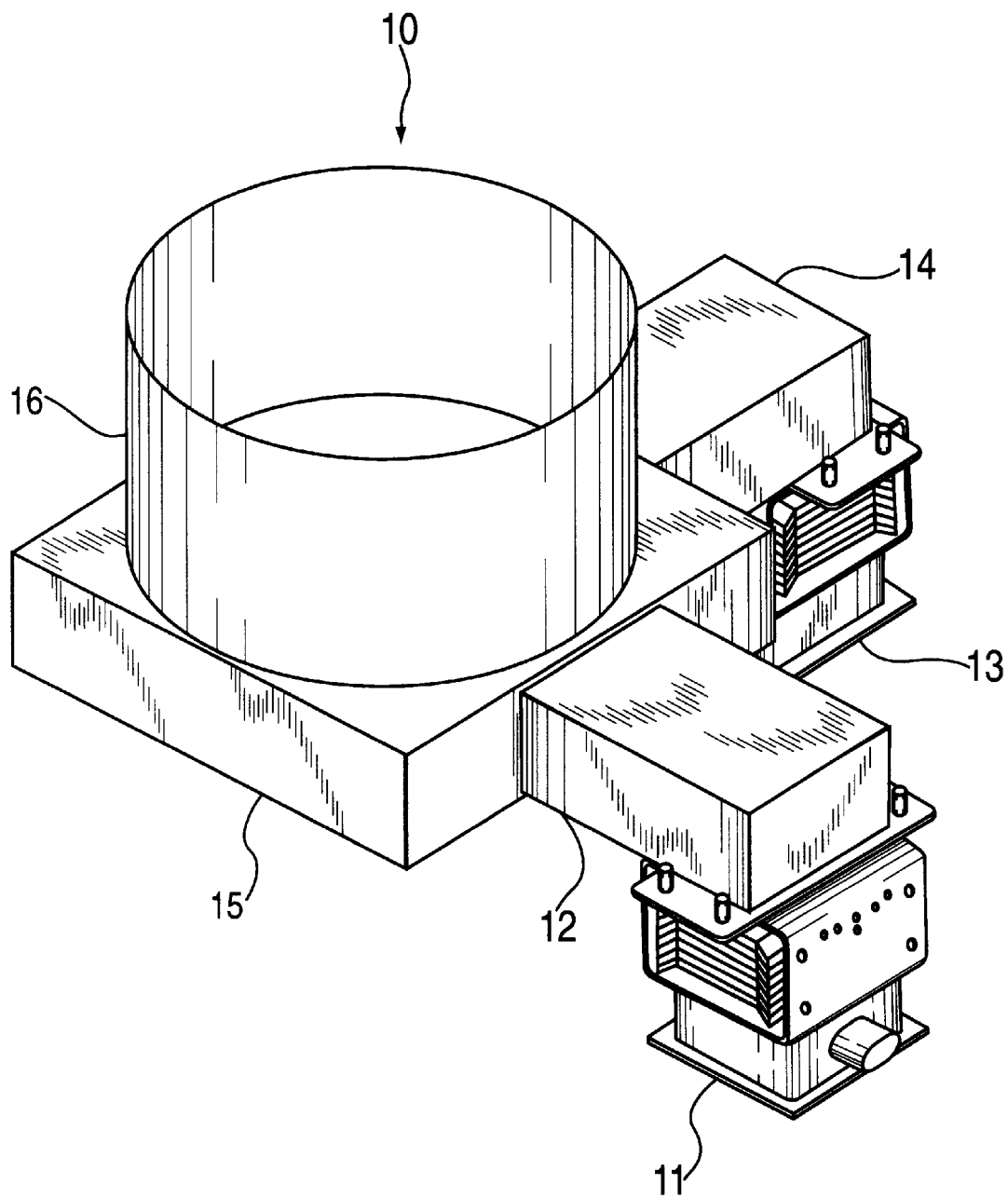
FIG. 1 is an isometric view of a prior art apparatus for providing microwave energy to a heating cavity.

Referring now to the drawings, and in particular to FIG. 1, the present invention is an improvement to the prior art microwave oven cavity excitation system shown therein which is generally disclosed in the McKee Patents, although, as one reasonably skilled in the art will recognize, the present invention can be applied to any system which implements heating by microwave energy.

Figure 2A:
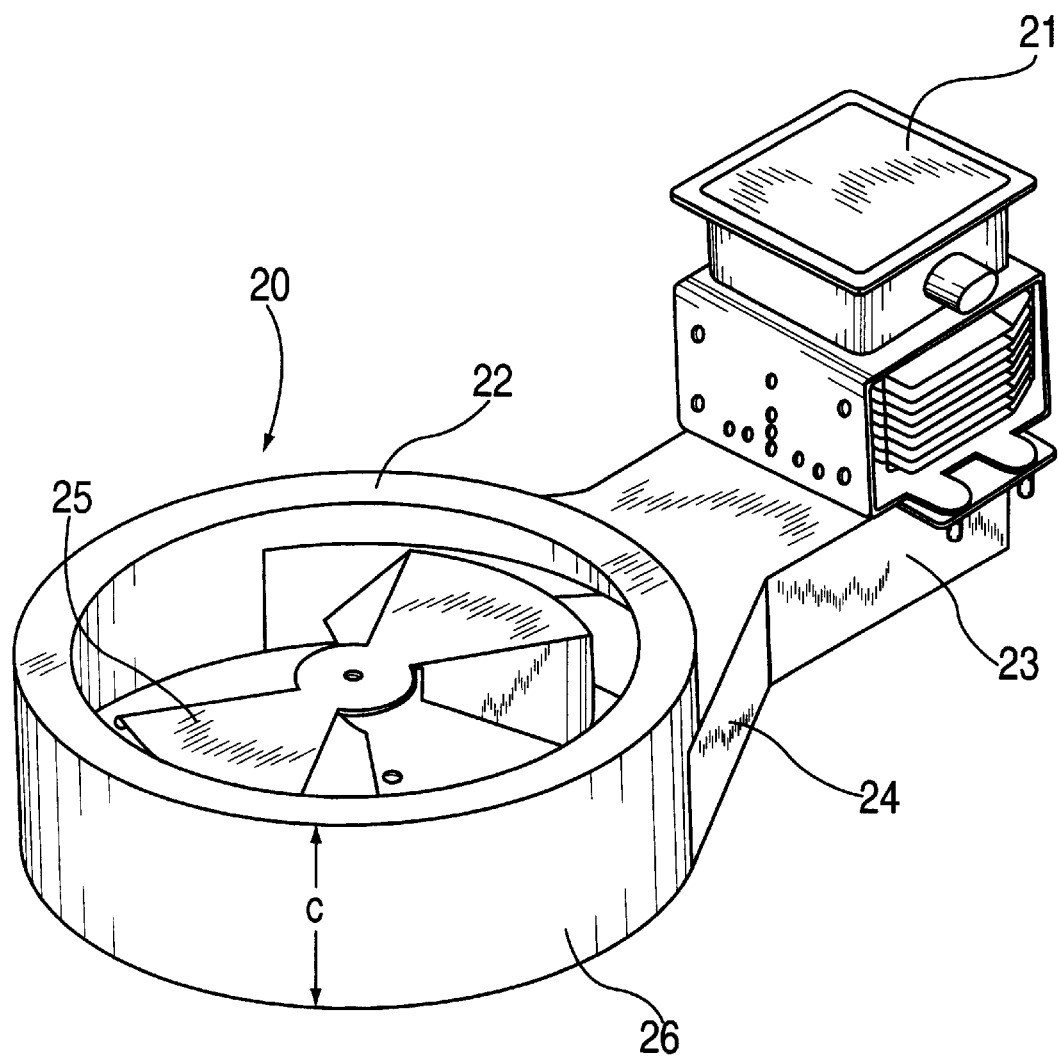
FIGS. 2A and 2B are an isometric assembly views of a preferred embodiment of the present invention.
Figure 2B:
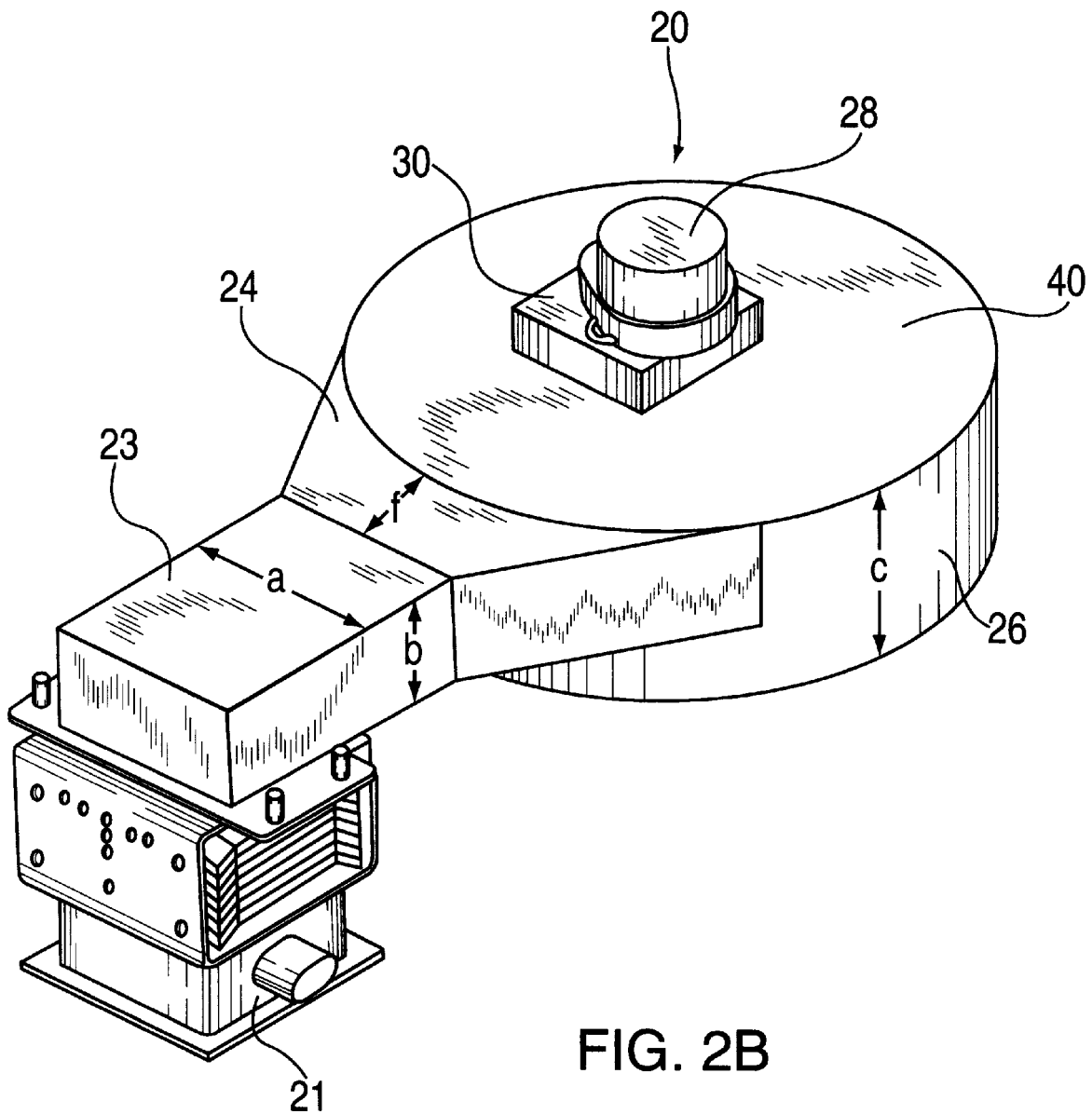
Figure 3:
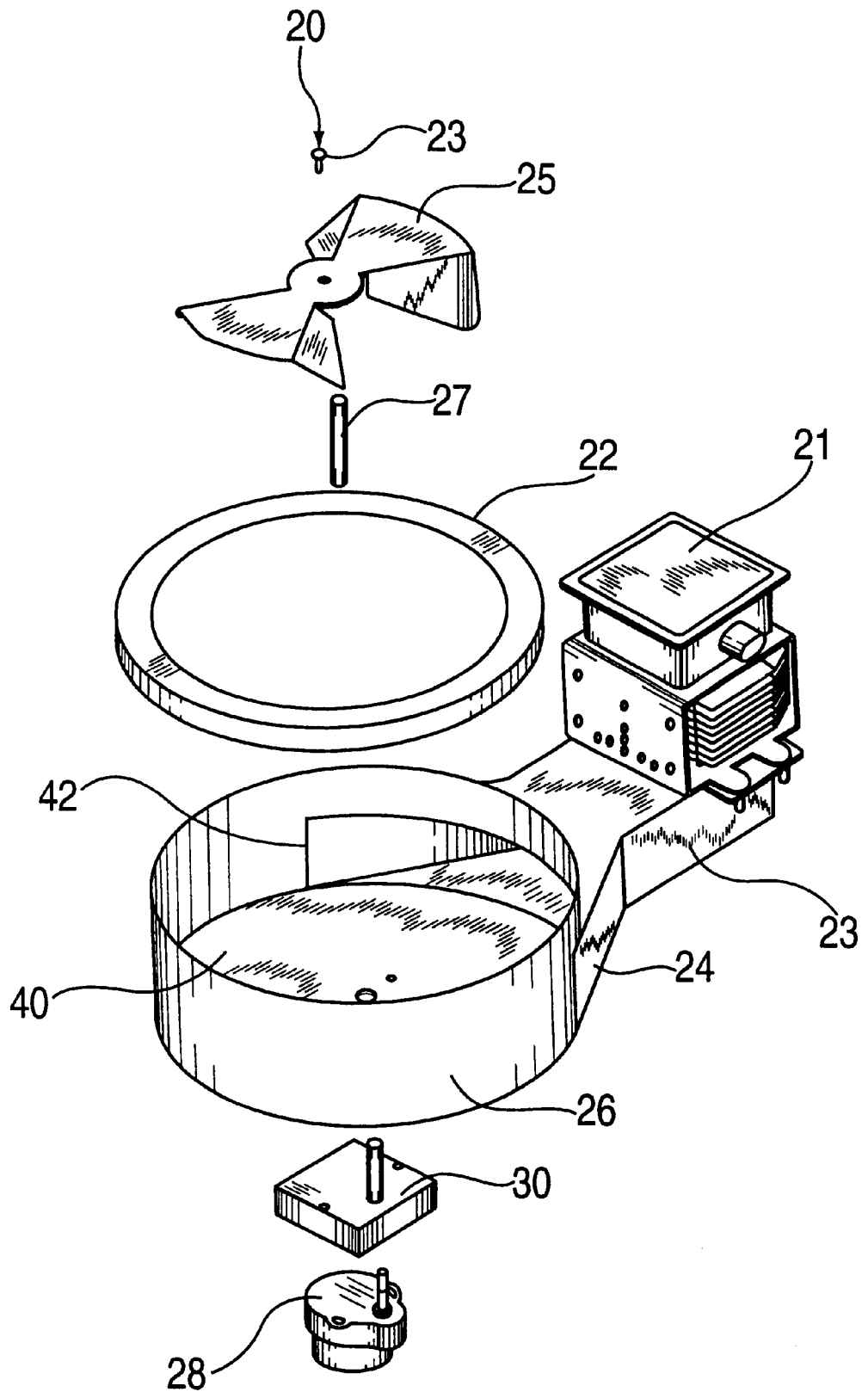
FIG. 3 is a first exploded isometric view thereof.
Figure 4:
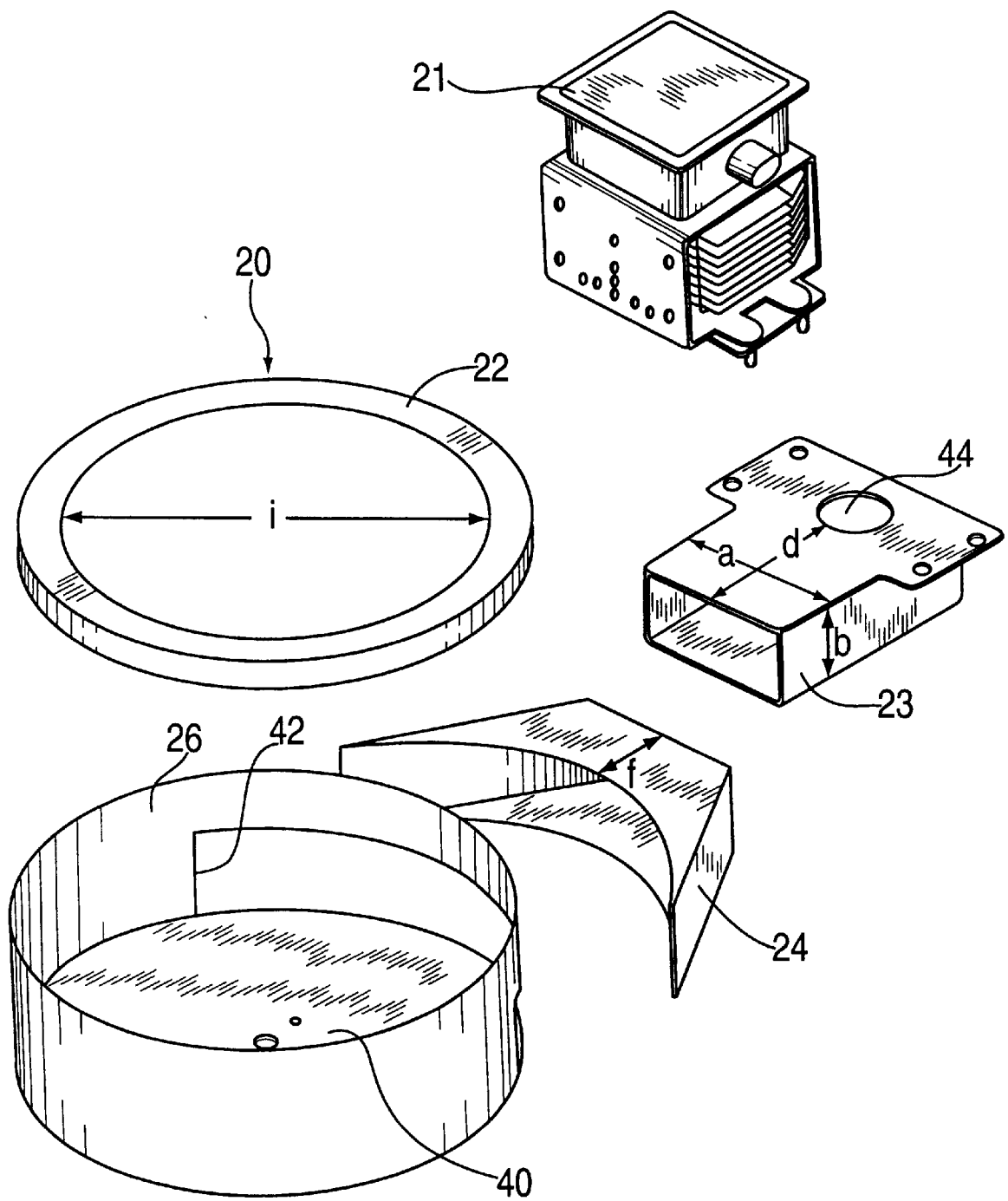
FIG. 4 is a second exploded isometric view thereof.

Referring now to FIGS. 2–4, therein illustrated is a preferred embodiment of the present invention which is generally designated by the reference numeral 20 and comprises a two-part waveguide including quarter-wave matching waveguide 24 and rectangular waveguide 23. Quarter-wave matching waveguide 24 has a first end mounted to launcher 26 at aperture 42 and a second end mounted to rectangular waveguide 23.

Launcher 26 is a cylindrical waveguide which directs microwave energy transmitted from the quarter-wave matching waveguide 24 to a heating cavity (not shown) which is disposed adjacently to launcher 26. Launcher 26 is constructed such that the cylindrical walls thereof are substantially parallel to the flow of microwave energy therefrom to the heating cavity. In the embodiment shown in FIGS. 2–4, the heating cavity is mounted directly above and centrally aligned with launcher 26 and includes a horizontal heating surface therein, such that the microwave energy is directed vertically upwards into the heating cavity, thereby creating an angle of ninety degrees between the flow of microwave energy and the horizontal heating surface. The heating cavity could also be mounted directly below and centrally aligned with launcher 26, in which case the microwave energy will also enter the horizontal heating surface at an angle of ninety degrees. In addition, as one reasonably skilled in the art will readily realize, launcher 26 may be mounted in various positions with respect to the heating surface within the heating cavity, in the event that it is desired to supply the microwave energy to the heating surface at angles other than ninety degrees.

Launcher 26 has a top closed end (not shown) which is transparent to microwave energy and a bottom closed end 40 which blocks the transmission of microwave energy therethrough.

Magnetron 21 is mounted to a top wall of rectangular waveguide 23 at an end remote from the end securing the rectangular waveguide 23 to quarter-wave matching waveguide 24. Similarly, magnetron 21 could be mounted to the bottom wall of rectangular cross-section waveguide 23. As is commonly known in the art, magnetrons emit microwave energy at a predetermined frequency. In the preferred mode of the present invention, magnetron 21 emits microwave energy at a nominal frequency of 2450 MHZ into rectangular waveguide 23 through aperture 44. The microwave energy passes through rectangular waveguide 23 into quarter-wave matching waveguide 24 and then into the cylindrical launcher 26, whence it is directed upwards into the heating cavity through the top closed end of launcher 26.

Preferably, a motor 28 is mounted below the bottom closed end 40 of launcher 26 using bracket 30, with a mode stirrer 25 mounted to a grounded shaft 27 with a fastener 29, and grounded shaft 27 in turn is mounted to motor 28 through aperture 41 in bottom closed end 40 of launcher 26. During operation, the motor 28 causes mode stirrer 25 to rotate to further ensure that a substantially uniform pattern of microwave energy is provided to the heating cavity.

Preferably, an iris 22 is disposed between cylindrical launcher 26 and the heating cavity (not shown) to help isolate the resonant cylindrical launcher 26 from the non-resonant heating cavity. The aperture in iris 22 has a diameter which is 1.5 times the wavelength of the lowest frequency at which magnetron 21 will operate, as determined from the specifications provided by the manufacturer of the particular magnetron. For example, a magnetron with nominal operating frequency of 2450 MHZ may be able to operate down to some lower frequency, such as 2440 MHZ. Thus in this case, since $\lambda=(3\times10^8(m/s))/(f(Hz))$, the diameter i of the iris is chosen to be:

$$i = 1.5 \cdot \left[ \frac{3 \cdot 10^8}{2440 \cdot 10^6} \right] \frac{m/s}{1/s} = 0.1844 \text{ m} = 18.44 \text{ cm} (7.26 \text{ inches}).$$

Launcher 26 is preferably formed in height c in multiples of one-half the free space wavelength of the microwave energy emitted by the magnetrons. For example, at a frequency f of 2450 MHZ, because $\lambda = (3 \times 10^8 (m/s))/(f(Hz))$, the free space wavelength, $\lambda$, is equal to 12.25 cm (4.82 inches). Thus, the height of launcher c is preferably equal to n/2×4.82 inches, where n is an integer greater than zero. The diameter of launcher 26 is preferably at least 1.5 times the wavelength, i.e., at least 1.5×4.82 inches for a nominal frequency of 2450 MHZ. The cylindrical walls of launcher 26 are aligned in a substantially vertical direction with respect to the horizontal heating surface within the heating cavity (not shown) in this embodiment. However, one reasonably skilled in the art will readily recognize, launcher 26 can be disposed at various angles with respect to the heating cavity, such that the walls of launcher 26 will form an angle of between zero and ninety degrees, absolute (i.e., in either direction), with respect to the horizontal heating surface within the heating cavity, thereby supplying microwave energy to the heating surface at an angle of between zero and ninety degrees.

Waveguide 23 is preferably of rectangular cross-section, with the sidewalls having a dimension b which is smaller than the dimension a of the top and bottom walls, although as one reasonably skilled in the art will recognize, waveguide 23 may be of square cross-section, wherein the dimension a is equal to the dimension b, or waveguide 23 may be of rectangular cross section with the dimension b greater than the dimension a. For waveguide 23, the sidewalls are aligned to be substantially parallel with the cylindrical wall of launcher 26. The actual dimensions a and b for waveguide 23 can be determined from the following equations, wherein $\lambda$ is the free space wavelength (which is known based upon the magnetron output frequency), $\lambda_g$ is the wavelength in the waveguide, and $Z_g$ is the impedance of the waveguide:

$$\lambda_g = \frac{\lambda}{\sqrt{1 - \left(\frac{\lambda}{2a}\right)^2 - \left(\frac{\lambda}{2a}\right)^2}} \quad (1)$$

$$Z_g = (592)\left(\frac{b}{a}\right)\left(\frac{\lambda_g}{\lambda}\right) \quad (2)$$

There will be a range of values possible for a and b. To determine the values for a and b, a desired impedance $Z_g$ is chosen, preferably in the range of 400–600 ohms, then simultaneous solution of equations are used to solve the two equations for selected values of a or b. Preferably, the aperture 44 to which magnetron 21 is secured is centrally aligned in the top or bottom wall of waveguide 23 and is positioned a distance d away from the open end of the waveguide 23, where d is calculated in integral multiples of one-half the wavelength $\lambda_g$. Indeed, in some special applications it may even be desirable to make waveguide 23 circular or elliptical in cross-section. Also, there may be applications where the magnetron 21 is secured to one of the sidewalls of waveguide 23, or even the closed end of waveguide 23.

Waveguide 24 is constructed in a quarter-wave matching section configuration. The distance of between the narrow end of the feed horn waveguide 24 and the apex of the arc formed by the connection of the top and bottom walls of the wide end of the feed horn waveguide 24 to launcher 26 is equal to ¼ times $\lambda_g$, using the same $\lambda_g$ calculated with respect to waveguide 23. Each sidewall of waveguide 24 is tangential to the circle which is formed by the cross-section of the cylindrical portion of launcher 26, and is aligned substantially parallel to the cylindrical wall of launcher 26. In the preferred embodiment, waveguide 24 is of rectangular cross-section with the top and bottom walls evenly spaced apart, although there may be certain situations in which waveguide 24 may be elliptical in cross-section, such as when waveguide 23 is circular or elliptical in cross-section and other situations when the top and bottom walls may also be spaced apart more at the wide open end thereof than at the narrow open end thereof.

The launcher 26 and waveguides 23 and 24 are of conventional materials, preferably formed from 304 stainless steel.

In the preferred embodiment, the waveguide structure connecting the magnetron 21 to the cylindrical launcher 26 consists of two parts, a rectangular waveguide 23 and a quarter-wave matching waveguide 24. In addition, an iris 22 is disposed between the cylindrical launcher 26 and the heating cavity. This is in direct contrast with the microwave cavity excitation system of the McKee Patents shown in FIG. 1, wherein the waveguides 12 and 14 are simply rectangular in cross-section and no iris is present. In addition, the microwave cavity excitation system of the McKee Patents shown in FIG. 1 includes an additional waveguide 15 which is not required in the present invention. By eliminating the additional waveguide 15 and adding quarter-wave matching waveguide 24 and iris 22, the apparatus of the present invention provides a microwave energy signal to the heating cavity with a much lower Q, measured broad band, and thus can hold the same voltage standing wave ratio (VSWR) over a wide range of internal loads. While providing this low Q signal, the present invention can also provide a very uniform illumination pattern in the microwave energy supplied to the heating cavity.

To summarize, the present invention provides an apparatus for transmitting a substantially uniform pattern of microwave energy to a heating cavity and illuminating a cavity with microwave energy which has a reduced dependence on loading within the cavity. In addition, the present invention extends the operating life of the microwave energy source and isolates the non-resonant heating cavity from the resonant microwave waveguide system.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. An apparatus for supplying a substantially uniform pattern of microwave energy to a heating cavity, comprising:
    (A) a cylindrical microwave launcher for radiating a substantially uniform pattern of microwave energy into a heating cavity, said cylindrical launcher including a first closed end transparent to microwave energy securable to the heating cavity, a second closed end to preclude microwave energy escape therethrough, and a cylindrical wall connecting first closed end and second closed end of said launcher, said launcher being mountable adjacent to the heating cavity;

(B) a first waveguide in a quarter-wave matching configuration having a wide open end and a relatively narrow open end, said wide open end of said first waveguide being secured to said cylindrical wall of said launcher for microwave communication therewith through the aperture in said cylindrical wall;

(C) a second waveguide having an open end secured to said narrow open end of said first waveguide for microwave communication therewith and a closed end opposite said open end to preclude microwave escape therethrough; and (D) a first source of microwave energy at a predetermined operating frequency secured to said second waveguide adjacent to said closed end for microwave communication therewith;

whereby a substantially uniform pattern of microwave energy from said first source is radiated into the heating cavity by said launcher.

2. The apparatus of claim 1, wherein said launcher has a diameter of at least 1.5 times the free space wavelength of the microwave energy, and said launcher has a height which is an integral multiple of one-half the free space wavelength of the microwave energy.

3. The apparatus of claim 1, additionally including a rotating mode stirrer mounted within said launcher.

4. The apparatus of claim 1, additionally including an iris disposed between said launcher and said heating cavity.

5. The apparatus of claim 1, wherein said first waveguide in a quarter-wave matching configuration is of rectangular cross-section and includes spaced apart top and bottom walls connecting said wide open end and said narrow open end, and spaced apart sidewalls connecting said wide open end and said narrow open end, said sidewalls being spaced apart more than said top and bottom walls at said narrow open end, the distance between said sidewalls being greater at said wide open end than at said narrow open end, said first waveguide being secured to said launcher such that said sidewalls of said first waveguide are substantially parallel to said cylindrical walls of said launcher; and said second waveguide is of rectangular cross-section and includes equally spaced apart top and bottom walls connecting said open end and said closed end of said second waveguide, and equally spaced apart sidewalls connecting said open end and said closed end of said second waveguide, said sidewalls of said second waveguide being spaced apart more than said top and bottom walls of said second waveguide, one of said top and bottom walls of said second waveguide having an opening adjacent to said closed end of said second waveguide, said second waveguide being attached to said first waveguide such that said sidewalls of said second waveguide are substantially parallel to said sidewalls of said first waveguide.

6. The apparatus of claim 5, wherein each of said top and bottom walls of said first waveguide has an interior surface and an exterior surface, and wherein each of said sidewalls of said first waveguide has an interior surface and an exterior surface such that said interior surfaces of each of said sidewalls of said first waveguide are spaced apart more than said interior surfaces of said top wall and said bottom wall of said first waveguide at said narrow open end of said first waveguide and the distance between said interior surfaces of each of said sidewalls of said first waveguide being greater at said wide open end of said first waveguide than at said narrow open end of said first waveguide; and each of said top and bottom walls of said second waveguide has an interior surface and an exterior surface, and wherein each of said sidewalls of said second waveguide has an interior surface and an exterior surface such that said interior surfaces of said sidewalls of said second waveguide are spaced apart more than said interior surfaces of said top wall and said bottom wall of said second waveguide.

* * * * *